US011636639B2

(12) United States Patent
Adamson, III

(10) Patent No.: US 11,636,639 B2
(45) Date of Patent: Apr. 25, 2023

(54) MOBILE APPLICATION FOR OBJECT RECOGNITION, STYLE TRANSFER AND IMAGE SYNTHESIS, AND RELATED SYSTEMS, METHODS, AND APPARATUSES

(71) Applicant: Robert G. Adamson, III, Draper, UT (US)

(72) Inventor: Robert G. Adamson, III, Draper, UT (US)

(*) Notice: Subject to any disclaimer, the term of this patent is extended or adjusted under 35 U.S.C. 154(b) by 0 days.

(21) Appl. No.: 17/067,680

(22) Filed: Oct. 10, 2020

(65) Prior Publication Data

US 2021/0110588 A1  Apr. 15, 2021

Related U.S. Application Data

(60) Provisional application No. 62/914,251, filed on Oct. 11, 2019.

(51) Int. Cl.
| | | |
|---|---|---|
| *G06T 11/60* | (2006.01) | |
| *G06K 9/62* | (2022.01) | |
| *G06T 7/194* | (2017.01) | |

(52) U.S. Cl.
CPC ............. *G06T 11/60* (2013.01); *G06K 9/627* (2013.01); *G06T 7/194* (2017.01); *G06T 2207/20081* (2013.01)

(58) Field of Classification Search
CPC ..................... G06T 11/60; G06T 7/194; G06T 2207/20081; G06T 11/001; G06K 9/627; G06K 9/34; G06K 9/6273
See application file for complete search history.

(56) References Cited

U.S. PATENT DOCUMENTS 10,096,122 B1 * 10/2018 Agrawal ................... G06T 7/11
10,878,567 B1 * 12/2020 Abid ....................... A61B 5/444
(Continued)

OTHER PUBLICATIONS

Dumoulin et al., "A Learned Representation for Artistic Style", Published as a conference paper at ICLR 2017, pp. 1-26.
(Continued)

*Primary Examiner* — Tapas Mazumder
(74) *Attorney, Agent, or Firm* — TraskBritt

(57) ABSTRACT

Trained segmentation, classification, and style transformation models are used to apply style effects to image segments corresponding to objects (e.g., a portrait of a person) present in an image. When depth information is included with a source image it may be used to segment, classify, and/or apply style transformation to an image or image segments (as the case may be). One or more of the segmentation, classification, and style transformations may be performed at a computing apparatus or as a service for example, in the cloud. A model management tool implemented at a server(s) may continuously train models using supervised or unsupervised training techniques to improve the quality of segmentation, classification and style transformation as well as add new capabilities. Updated models may be pushed to services offering image processing. Additionally or alternatively, a mobile application can inquire about versions of models and request updated models, or in another case, the model management tool may push updates to the mobile application. Thus, the mobile application may perform on-board image processing including segmentation, classification, and style transformation.

22 Claims, 12 Drawing Sheets
(3 of 12 Drawing Sheet(s) Filed in Color)

(56) References Cited

U.S. PATENT DOCUMENTS

| | | | |
|---|---|---|---|
| 2013/0235081 A1* | 9/2013 | Ishibashi | G06T 11/60 |
| | | | 345/638 |
| 2018/0103213 A1* | 4/2018 | Holzer | G06N 3/08 |
| 2018/0165854 A1* | 6/2018 | Du | G06N 20/00 |
| 2020/0286151 A1* | 9/2020 | Jain | H04N 21/8153 |
| 2021/0042625 A1* | 2/2021 | Chopra | G06N 3/0454 |
| 2021/0042950 A1* | 2/2021 | Wantland | G06T 19/006 |
| 2021/0279269 A1* | 9/2021 | Verma | G06F 40/117 |
| 2021/0365732 A1* | 11/2021 | Lin | G06K 9/32 |

OTHER PUBLICATIONS

Gatys et al., "Image Style Transfer Using Convolutional Neural Networks," 2016 IEEE Conference on Computer Vision and Pattern Recognition (CVPR), 2016, pp. 2414-2423, doi: 10.1109/CVPR.2016.265.

Hertzmann et al., "Image Analogies", Proceedings of the 28th annual conference on Computer graphics and interactive techniques, Aug. 2001, 14 pages.

* cited by examiner

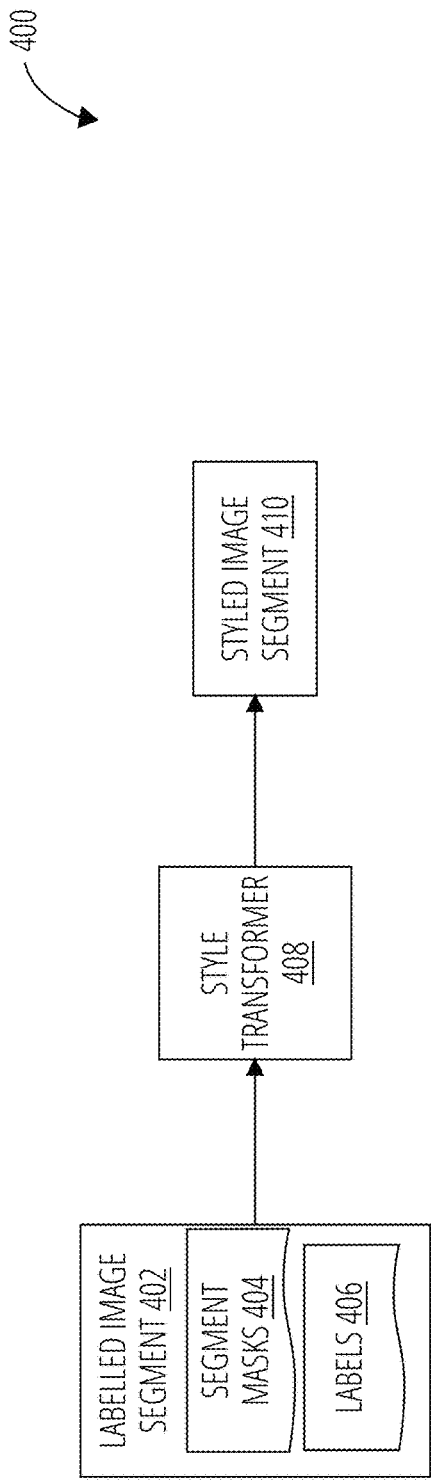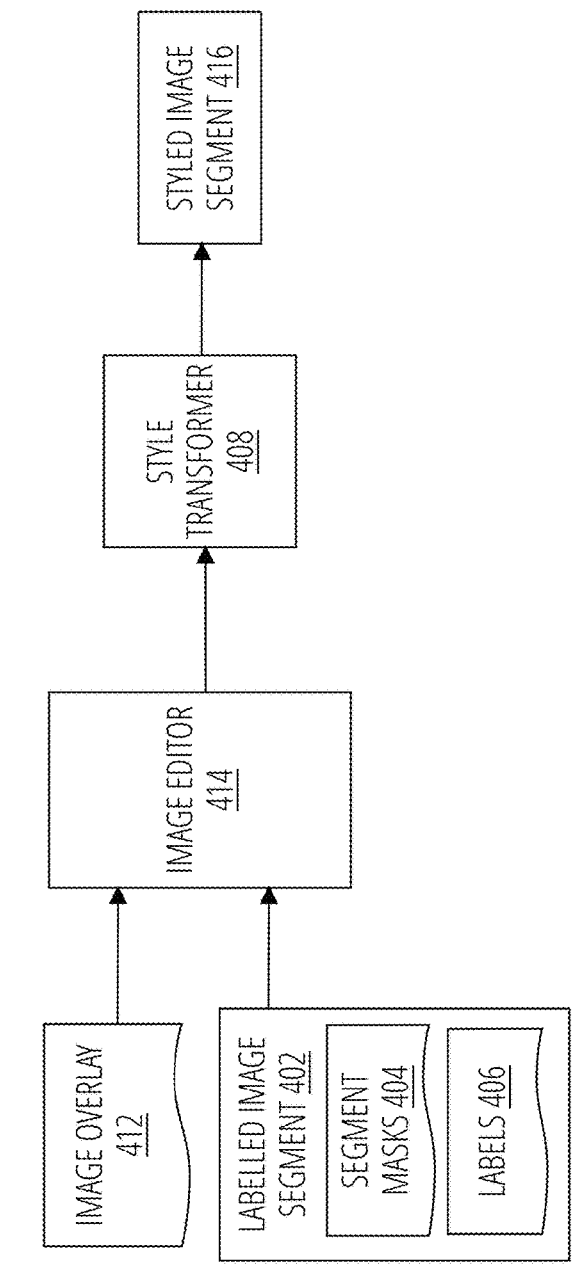

MOBILE APPLICATION FOR OBJECT RECOGNITION, STYLE TRANSFER AND IMAGE SYNTHESIS, AND RELATED SYSTEMS, METHODS, AND APPARATUSES

CROSS-REFERENCE TO RELATED APPLICATION

This application claims the benefit of the priority date of U.S. Provisional Patent Application No. 62/914,251, filed Oct. 11, 2019, and titled "MOBILE APPLICATION FOR OBJECT RECOGNITION, STYLE TRASNFER AND IMAGE SYNTHESIS," the disclosure of which is incorporated herein in its entirety by this reference.

FIELD

Disclosed embodiments relate, generally, to image processing and image editing. More specifically, some embodiments relate, generally, to deploying machine learning models for object classification and style transfer modules of a mobile application that were trained using image segments. More specifically still, some embodiments relate, generally, to deploying machine learning models for object segmentation modules of a mobile application, such models trained to segment objects from images using depth information captured by a camera of a mobile device.

BACKGROUND

Image processing is the process of using a computer to apply an algorithm (the process) to a digital image, for example to enhance or filter the digital image or to discern information about the image. Computer image editors are tools for modifying or changing a digital image in some desired manner, some of which may use image processing.

BRIEF DESCRIPTION OF THE DRAWINGS

To easily identify the discussion of any particular element or act, the most significant digit or digits in a reference number refer to the figure number in which that element is first introduced. The patent or application file contains at least one drawing executed in color. Copies of this patent or patent application publication with color drawing(s) will be provided by the Office upon request and payment of the necessary fee.

FIG. 4A a functional block diagram depicting style effects process flow, in accordance with one or more embodiments.

FIG. 4B is a functional block diagram depicting style effects process flow, in accordance with one or more embodiments.

DETAILED DESCRIPTION

Figure 1:
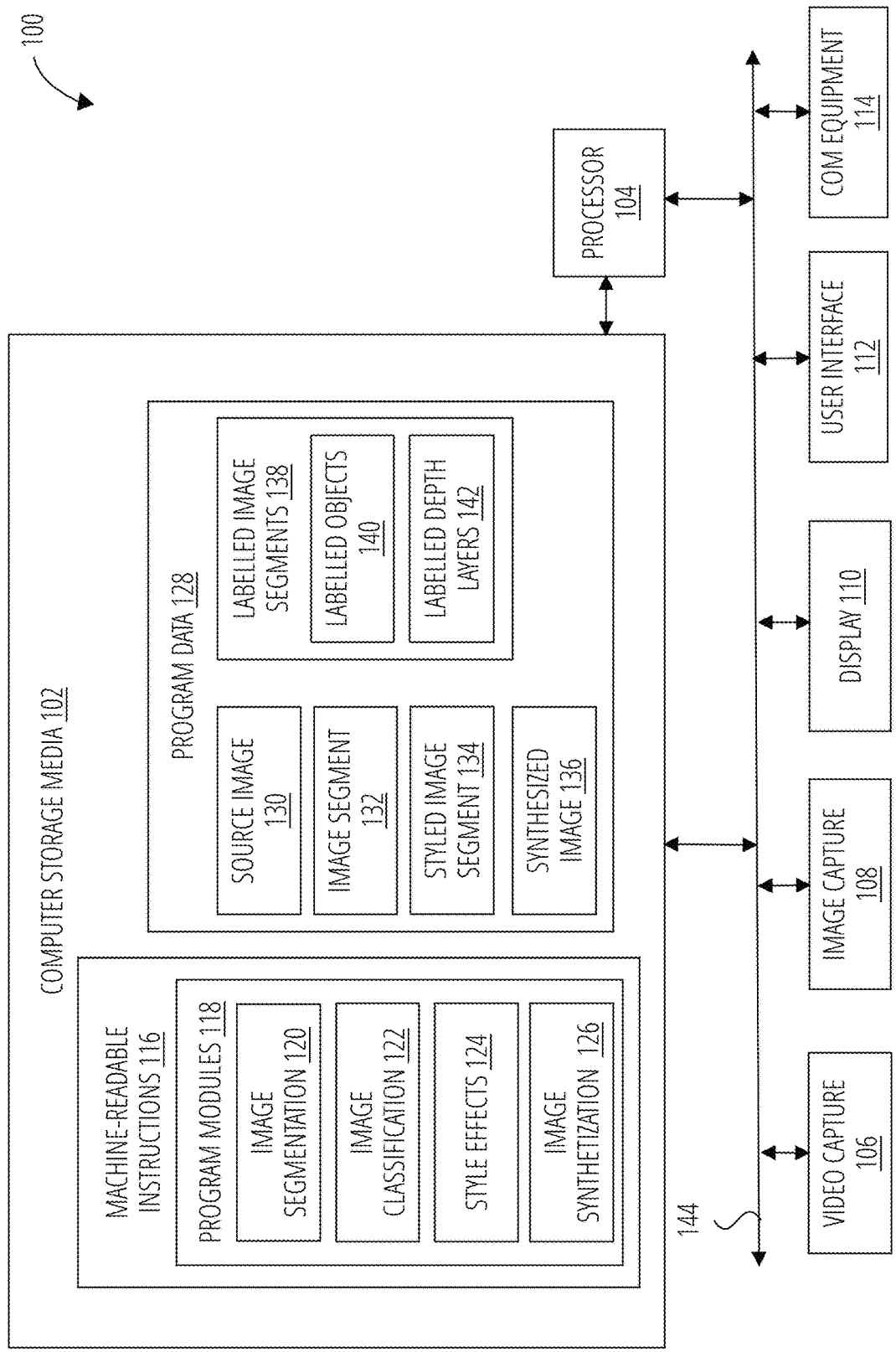
FIG. 1 is a schematic diagram depicting a computing apparatus that is a non-limiting example of an operating environment configured to perform object recognition, style transfer and synthesis, in accordance with one or more embodiments.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. Other embodiments, however, may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code (e.g., machine-readable instructions, without limitation) on computer-readable media. Computer-readable media includes both computer storage media and communication media including any medium that facilitates transfer of a computer program from one place to another. Instructions or code on a computer-readable media may form at least a portion of a computer program product.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

As used herein, "network" means one or more data links that enable transport of electronic data between or among: functional units, computing apparatuses, or computing systems. When information is transferred or provided over a network or another communications connection (either hardwired, wireless, or a combination of hardwired or wireless) to a computing apparatus or computing system, the computing apparatus or computing system properly views the connection as a transmission medium.

An "image" is a two-dimensional (2D) function $f(x,y)$, where x and y are the spatial (plane) coordinates, and the amplitude of the function $f$ at any pair of coordinates (x,y) is the intensity of the image at that level. A "digital image" is an image where x, y and amplitude values off that are finite and discrete quantities. A digital image may include a finite number of elements called "pixels," each of which has a particular location and value. In the following description, "image" and "digital image" are used interchangeably to mean "digital image," unless otherwise expressly stated. Images may represent a still scene, in terms of how the still scene would be depicted on a display by a computer and, additionally or alternatively, in terms of other information about an image or scene that may or may not be alone sufficient for a computer to depict the image. Non-limiting examples of such other information include markers specifies the start and end of pixel information, exchangeable image file format (EXIF) information that specifies format for images (e.g., JPEG, TIFF, or GIF, without limitation), and metadata (e.g., specifying structure, reference, statistics, copyright, owner, users, size, compression type, creation date, modification date, without limitation).

Pixels may be represented by pixel information, such as information about a color pixel image and/or a depth pixel image. A color pixel image is information about contributions of colors—typically red, green, and blue, and by implication, white and black—at specific locations on a grid. A depth pixel image is information about the distances of specific locations on a grid of an image from a specific viewpoint. Non-limiting examples of a depth pixel image include a depth matte mask or a depth map. For a given depth pixel image, the central axis of view may be an absolute z-axis of a scene or a z-axis of an image capture device (e.g., a camera). In disclosed embodiments, locations in a grid are typically not encoded in pixel information, but encoding such information is specifically contemplated and would not exceed the scope of this disclosure.

An image may be used by a computer (e.g., a mobile device such as a smart phone, a tablet computer, a laptop computer, a desktop computer, a workstation, a kiosk, a smart speaker with display, a media center, a game console, and combinations thereof, without limitation) to depict a scene represented by the image, or a portion thereof, on a display. Generally speaking, a color pixel image is sufficient for a computer to depict a two-dimensional (2D) or three-dimensional (3D) scene.

Volumetric information, such as a voxel, represents an image element in 3D space such that a 2D projection of a 3D image may be depicted. Techniques specifically for depicting a 2D projection in 3D space using volumetric information (e.g., voxels) and systems that implement the same known to the inventor of this disclosure are different and generally unsuitable for depicting scenes represented by image color pixel images and/or depth pixel images, and vice versa.

As used herein, "photo" means an image generated by capturing a scene using a camera. As used herein, "video frame" means an image generated by capturing a single frame of a video or combining several frames of a video into a single frame.

Images may be captured by one or more cameras of an image or video capture system. An image or video capture system may include or co-operate with a depth sensors configured to capture depth information about one or more objects present in a scene via a depth signal (e.g., reflected infrared light or laser, or a parallax shift, without limitation), and generate a depth pixel image in response to the depth signal (e.g., directly or after processing the depth signal).

In one or more embodiments, methods, apparatuses and systems process an image to generate a synthesized image that includes useful recognition information and location mapping information about an object present in the image and a confidence level in the useful information, and marks the object present in the image that the useful information applies to. The way we do this is we apply image segmentation to the image to mark the presence of a known object type in the image (e.g., via a pixel-wise mask generated for each image and that can be combined with the color pixel image and depth pixel image via a bit-wise operation and the combination depicted) and to label the image segment with an indication of a known class type. Further classifiers may be selected and applied to the image segments in response to the initial class label and a specific application to further label the image segments.

The App uses both semantic and instance segmentation. Semantic segmentation classifies multiple objects into a single instance. Instance segmentation identifies each of these objects individually—each their own instance. A mask is a binary image saved in a user application or in memory that consists of zero and non-zero values. The mask is generally the same size (e.g., number of rows and columns of pixels, without limitation) as a target image. All pixels in the target image that correspond to a zero value pixel in the mask are set to zero. All other pixels in the target (i.e., which should correspond to the non-zero value pixels in the mark) remain the same (value does not change). The zero pixels represent transparency in the target image thereby isolating a segment from the rest of the target image. The target(s) might be a color image or a depth matte image or both. Both color and depth of the segment itself are preserved in the target image(s).

FIG. 1 is a schematic diagram depicting a computing apparatus 100, a non-limiting example of an operating environment configured to perform object segmentations, image recognition, style transfer and image synthesis, in accordance with one or more embodiments.

A given computing apparatus 100 may include one or more processors 104 configured to execute program modules of machine-readable instructions 116 and program data stored at computer storage media 102. When executing one or more program modules 118 and optionally using program data 128, processors 104 may perform some or a totality of the operations, features, and functions of embodiments discussed herein. Computing apparatus 100 may include one or more peripheral components in communication with processors 104 and computer storage media 102 via bus 144, including without limitation, video capture 106, image capture 108, display 110, user interface 112 (e.g., a touch panel, a pointer device, a voice command recognition systems, without limitation), and COM Equipment 114 (i.e., communication equipment).

Program modules 118 may include image segmentation 120, image classification 122, style effects 124 and image synthetization 126, which respectively may include machine-readable instructions for performing some or a totality of the options, features, and functions of embodiments discussed here. In various embodiments, one or more of the program modules 118 may include one or more machine learning models trained to perform some or a totality of the operations, features and functions of embodiments discussed herein. Additional programs modules that are not depicted but may be included with program modules 118 are image editor 414 and image editor 508 (which may be the same or different image editors), and graphical user interface configured to manage a workflow for image selection, initiating segmentation and classification, background selection, and synthesized image generation, in accordance with one or more embodiments.

As used herein, "machine learning model" means an algorithm defined by logic learned from data. Such an algorithm may be encoded using any suitable model type, such as: as neural networks, convolutional neural networks, tree ensembles, support vector machines, recurrent neural networks, and generalized linear models, without limitation. Some or a totality of the logic of a machine learning model may be implemented by machine-readable instructions and performed by a computer. In various embodiments one or more machine learning models may be, or form a portion of, a portable electronic file (or just "portable file"). As a non-limiting example, a machine learning model may be configured to analyze an input (e.g., one or more of an image, an image segment, or text, without limitation), discern specific types of patterns, and infer something about the input in response to any discerned patterns.

As a non-limiting example, a machine learning model may be a portable file that has been trained to recognize and analyze certain types of patterns. The model is trained over a set of data by providing it with algorithms the model uses to reason over and learn from the data—which is often called "machine learning." Once trained, the machine learning model is able to reason over new data that it has never seen before, and make predictions about the new data.

Image segmentation 120 is configured, generally, to identify and segment an object present in a source image 130 from a background of the source image 130 to obtain image segment 132 of such object and background. In some instances, an image segment 132 of an object may include a source image 130 and an image segment mask (e.g., a pixel-wise mask, without limitation) that marks an object (e.g., marks a location of an outline or area of an object in source image 130) and attaches a label that categorically classifies the object. Such a segment mask may be applied to the source image 130 change values of pixels in the source image 130 that are not associated with the object thereby defining the object in the resultant image (e.g., an edited source image or a copy). Similarly, image segment 132 of a background may include an image segment mask that marks a background (e.g., marks a location of an outline of a background in source image 130).

Non-limiting examples of file formats of images (e.g., source images, image segments, or synthesized images, without limitation) include: PNG, JPEG, RAW, and TIFF. Non-limiting examples of file format types of video (e.g., for grabbing a frame) include MP4, MOV, and WMV.

Image classification 122 may be configured, generally, to apply recognition and classification to a segmented image, and more specifically to an object present in one of the image segment 132 (a "segmented object"), to classify (and optionally further classify) the object into one or more categories and obtain labelled image segments 138, including labelled objects 140 and labelled depth layers 142.

Style effects 124 may be configured, generally, to apply style transfer effects to a segmented object. Style effects 124 may include one or more machine learning models for style transfer or style transformation. In the case of style transfer, a machine learning model has been trained to discern and apply the style of a style image to the content of a content image—stated another way, change expressive elements of a segmented content image to more closely match expressive elements of a segmented style image. In the case of style transformation, a machine learning model has been trained to change expressive elements of a segmented content image, typically of a specific recognized categorical class (e.g., human, building, animal, automobile, plant, without limitation). In the case of style transformation, the machine learning model is trained using e.g., a photo and a painting or graphical representation of the photo having a desired style.

Image synthetization 126 may be configured, generally, to combine one or more of a styled image segment 134, a background image, an overlay image, and display information (e.g., text, a stamp, a logo, or an icon, without limitation) into a synthesized image 136. In a contemplated use, a background present in a source image 130 may be "replaced" with an image of a new background (e.g., using convolutional techniques for combining images, without limitation). Overlays and display information may be combined after or before style transfer effects are applied.

In one or more embodiments, a source image may be obtained for image processing, as non-limiting examples, via image capture 108 or video capture 106. Source images may be generated substantially contemporaneously with image processing discussed herein, or generated substantially non-contemporaneously with image processing and obtained from an image library or gallery stored local to computing apparatus 100 or accessible by computing apparatus 100 via an electronic network (not depicted) such as from a remote library of content. Image and/or video capture by components that are remote from the computing apparatus 100 is specifically contemplated and does not exceed the scope of this disclosure.

In some embodiments, image capture 108 and/or video capture 106 include a depth sensing system, such as a dual-lens camera that uses lens separation to detect a parallax shift to measure depth. Objects closer to the shift by a greater distance between the two lenses. This parallax shift based on distance is commonly referred to a "disparity," and is used by software to segment a person's portrait from the rest of an image.

A single lens camera can also measure depth. As a non-limiting example, by projecting an infrared light pattern in front (i.e., toward the scene). Software observes the infrared pattern distortions reflected from objects in front of the camera lens, and calculates distances from a view-point to each point in the image. Using the calculated depth information (here the distances to locations on a grid), software generates a disparity depth matte type of depth pixel image that may be used to segment a portrait from the rest of an image.

Figure 2A:
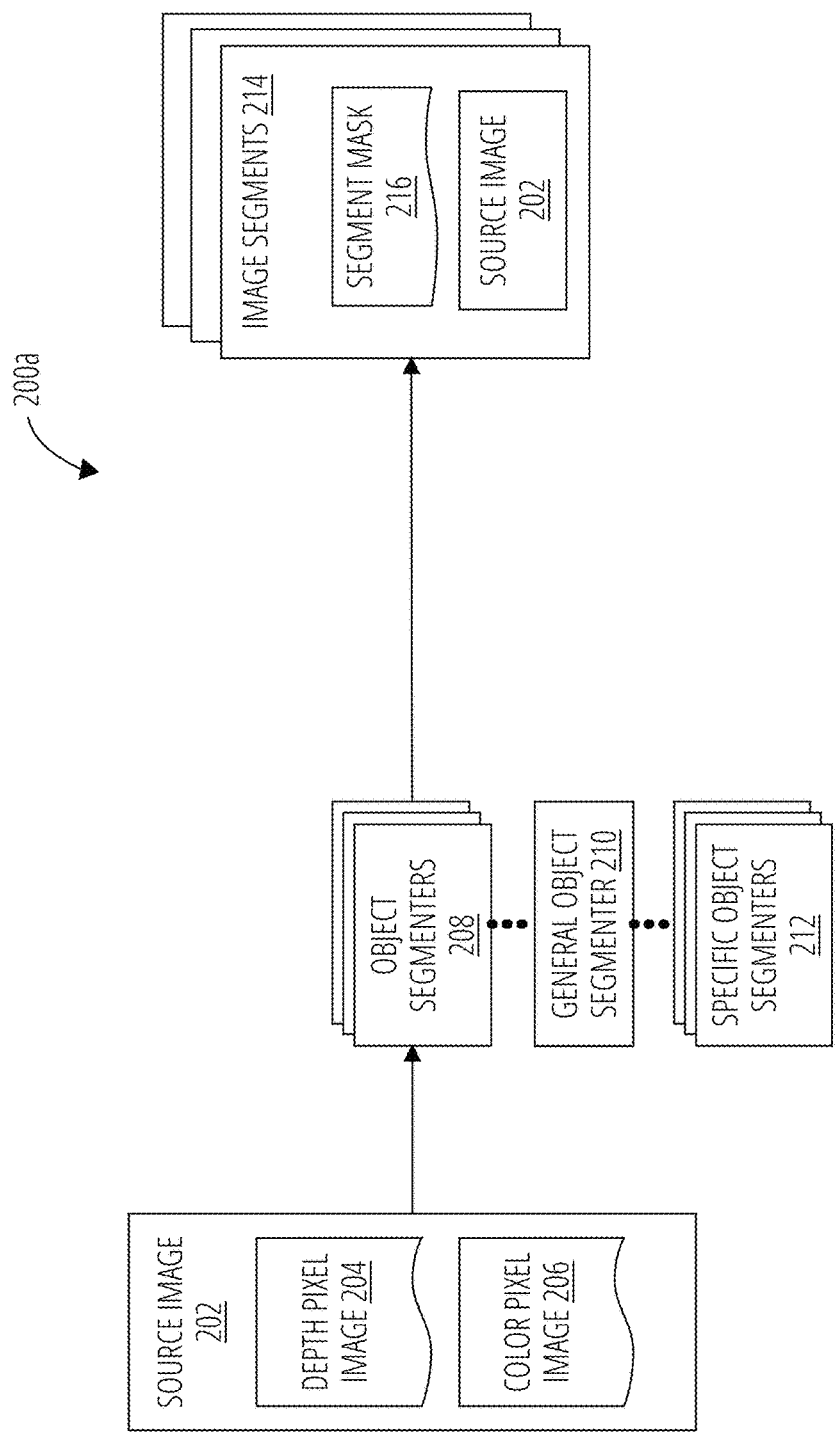
FIG. 2A is a functional block diagram depicting an image segmentation process flow, in accordance with one or more embodiments.

FIG. 2A is a functional block diagram depicting image segmentation 200a in accordance with one or more embodiments. Image segmentation 200a is a non-limiting example implementation of image segmentation 120 of FIG. 1.

Generally speaking, image segmentation is a process for generating one or more image objects that respectively include or define pixels of one or more portions of a source image that correspond to the identified objects—i.e., image segments having the objects present therein.

In some embodiments, source images 202 segmented by image segmentation 200a are photos or video frames that have a color pixel image and a depth pixel image, generated by depth sensing cameras (e.g., dual lens, laser, or infrared as disused above). In the specific non-limiting example depicted by FIG. 2A, source image 202 includes depth pixel image 204 and color pixel image 206.

Dual lens cameras, such as those sometimes included with a mobile phone, tablet computer, or a video camera, without limitation, typically produce two images while in a "portrait" mode of operation: a color pixel image and a depth pixel image. As discussed above, in a depth pixel image, each pixel represents distance instead of color. When an object is present in an image (e.g., such as a person's portrait without limitation), a depth pixel image contains information about distances between surfaces of the objects and a given view-point.

Object segmenters 208 may include a computer algorithm developed (e.g., programmed by a developer, without limitation) and/or trained image segmentation models, in either case for generating a segment mask 216 of image segments 214. In cases where a source image 202 includes depth information, an algorithm can discriminate between objects present in a foreground of an image and background of an image based on a depth. In the case of an image captured of a scene using a "portrait mode" of operation, it may be generally assumed that a portrait object present in the image is the subject of the scene and thus the "object of interest" for purposes of image segmentation and classification. Using depth information, a "near" object (i.e., present in the foreground of source image 202) may be segmented from the background, as a non-limiting example, as if the background in the scene was a so called "green screen."

Any type of segment mask suitable for bit wise operations with images may be used, such as a pixel-wise mask, without limitation. It is specifically contemplated that images and video frames may be segmented on the fly, e.g., with convolutional neural networks, without limitation, optionally with a segmented mask but which is not retained (e.g., because the mask has been applied to the image, without limitation).

Object segmenters 208 may include specific object segmenters 212 configured to segment specific types or categories of objects, e.g., specifically programmed for, or trained by, images that include human portraits, building portraits, automobile portraits, or animal portraits, without limitation. Additionally or alternatively, object segmenters 208 may include general object segmenter 210 configured to segmented based on a general shape of objects, e.g., specifically programmed for, or trained by, images of objects having shapes such as circular, rectangular, or triangular, without limitation.

In some cases, image or video capture used to generate a source image may not generate a depth pixel image, depth information may not be included with a source image 202, or included but just not useable or available. In some embodiments, an object present in an image may be segmented by a deep learning model trained to generate substitute depth pixel image, or by applying a segmentation model trained to segment objects and/or background without depth information. In some embodiments, object segmenters 208 may include trained image segmentation models configured to generate segment mask 216 in response to color pixel images, and more specifically, configured to segment objects present in source image 202 in response to color pixel image 206.

As a non-limiting example, deep learning segmentation models may be trained by an algorithm such as DeepLab, without limitation, that may be used to segment a person, animal or other object once it has been trained on images having these objects—but without additional depth information such as a depth pixel image.

Deep learning models are a class of machine learning models. Deep Learning image segmentation is the task of partitioning an image or image segment into multiple segments with trained machine learning models. It is a way of identifying and separating (e.g., isolating) items (e.g., objects, without limitation) from an image or image segment, such as people and animals, without having access to pixel depth. In one or more embodiments, the segmentation method used is an open-source semantic segmentation model. There is an encoding phase and a decoding phase used to segment images and frames.

In an encoding phase, an input image is preferably used to generate a high-dimensional feature vector. In the decoding phase, the high-dimensional feature vector is preferably used to generate a semantic segmentation mask. The mask preferably contains depth for each pixel.

By way of non-limiting example for training object segmentation models: Deep Convolutional Neural Networks or multispectral segmentation may be applied to analyze an image. Generally speaking, each neuron in one layer is connected to all neurons in a next layer; Atrous convolution (also known as dilated convolution) allows repurposing of pre-trained neural networks to extract denser feature maps; Conditional Random Fields (CRFs) localize segment boundaries (e.g., to an outline of the shape of an object, without limitation).

Figure 2B:
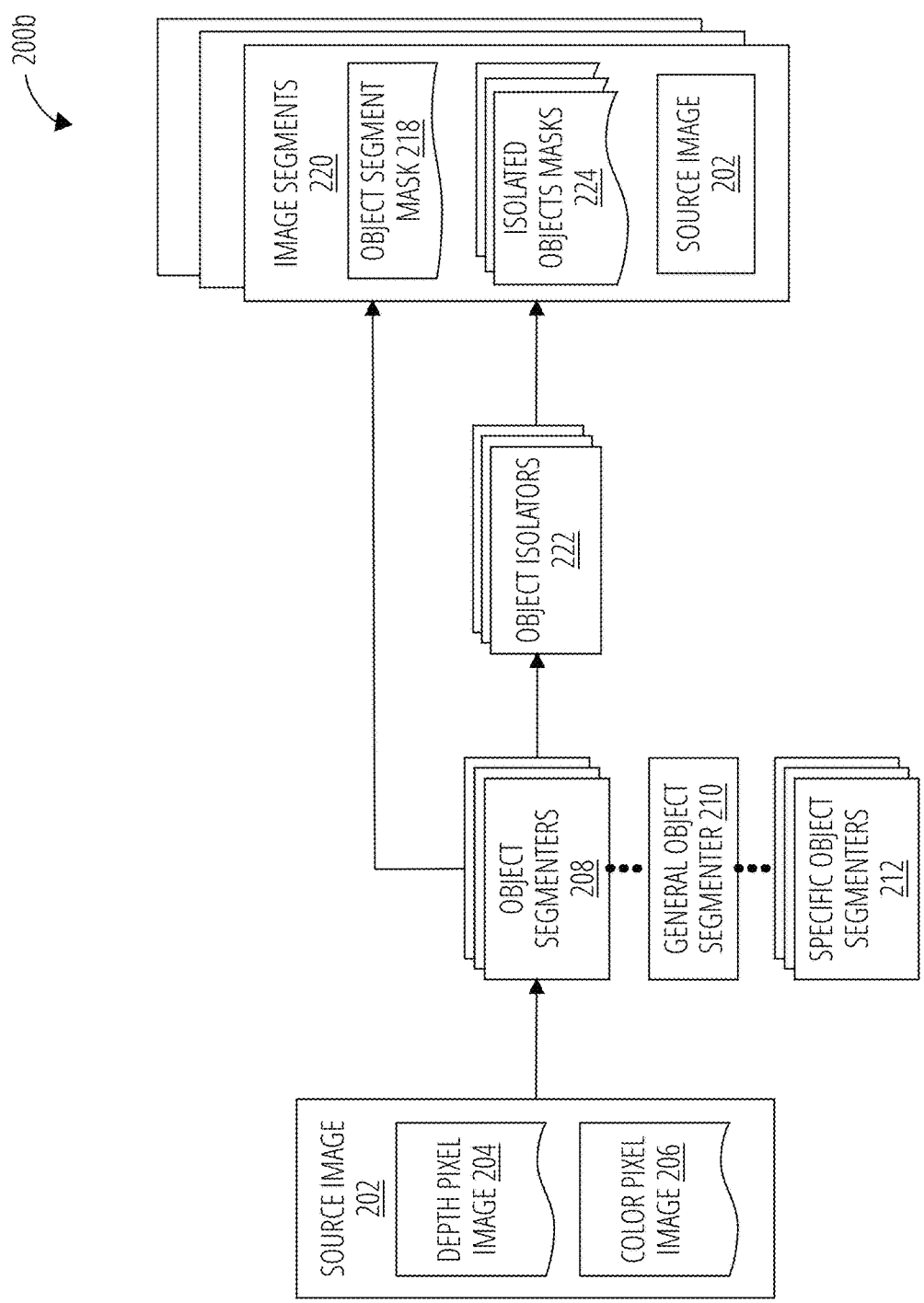
FIG. 2B is a functional block diagram depicting an image segmentation process flow, in accordance with one or more embodiments.

FIG. 2B is a functional block diagram depicting image segmentation 200b in accordance with one or more embodiments. Image segmentation 200b is another non-limiting example implementation of image segmentation 120 of FIG. 1.

In some cases, it may be useful to segment an object from a background and then isolate other objects from the segmented object. As a non-limiting example, segment a person's portrait from a background and then isolate her face, eyes, nose, hair, etc., from her portrait. As a further non-limiting example, segment a structure from a background and isolate structure elements from the structure, such as doors, windows, turrets, stairs, roof, gutter, chimney, and/or architectural design elements, without limitation.

Image segmentation 200b includes object isolators 222, which may include deep learning segmentation models trained to segment objects from other objects, including objects that may not be measurably or consequentially different from a primary segmented object in terms of depth (e.g., depth of a face may be substantially the same as the average depth of a person's portrait, without limitation). In some cases, as discussed above, depth information may not be available and object segmenters 208 may have included deep learning models for image segmentation without depth information.

Object segmenters 208 may be configured to generate object segment mask 218 of image segments 220 and object isolators 222 may be configured to generate isolated objects masks 224 from segmented objects, e.g., generated by applying object segment mask 218 to source image 202.

In some embodiments, if multiple instances of other objects are present in a semantic image (i.e., a semantic type of segmented image) with a depth matte used, at least in part, to segment the object, those instances may be isolated by Deep Learning models. So here we would be applying both together. In a contemplated operation, isolate just the face of the segmented portrait of a person and apply style transfer to just the isolated face.

Figure 3:
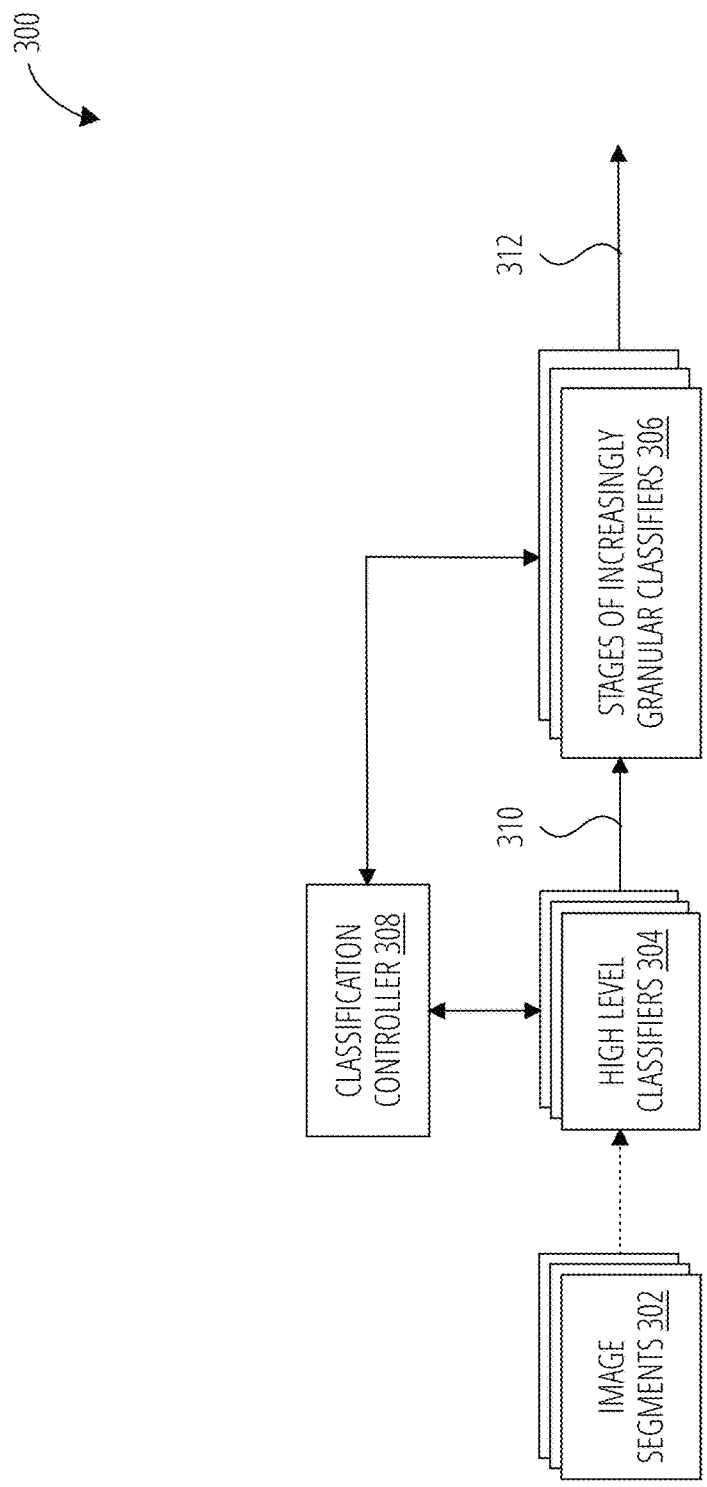
FIG. 3 is a functional block diagram depicting image classification process flow, in accordance with one or more embodiments.

FIG. 3 is a functional block diagram depicting image classification 300 in accordance with one or more embodiments. Image classification 300 is a non-limiting example implementation of image classification 122 of FIG. 1.

In one or more embodiments, high level classifiers 304 and stages of increasingly granular classifiers 306 perform image recognition and classification on image segments 302 using artificial intelligence (AI) or machine learning trained models. In one embodiment, the methods and systems use IBM Watson for training models on a cloud server based on image segment training exemplars, and then use Apple CoreML for using the trained models on a local device or computer.

IBM Watson may be thought of as a classification model manager. IBM Watson image recognition is configured, generally, to train a model to classify images using exemplar images with known classifications that uploaded to a cloud computing environment (also referred to herein as a "cloud"). For example, image recognition works by the creation of a neural network with examples of classified images. The neural network then processes the individual pixels of an image. The network may be taught to recognize similar images by providing it with many examples. The trained models may be further trained to improve performance as more images having known classifications are uploaded to the cloud.

Once trained, image classification models may recognize similar images to the training images and apply labels accordingly. In one or more embodiments, trained models of high level classifiers 304 and stages of increasingly granular classifiers 306 may be trained using labeled image segments for the training data.

High level classifiers 304 and stages of increasingly granular classifiers 306 of trained image classification models may be deployed in image classification 300 using classification controller 308. In some embodiments, classification controllers 308 may be a software specific to an application using the machine learning models. Additionally or alternatively, in some embodiments, classification controller 308, may be software such as a machine learning framework that assists with integration of use of machine learning models by applications across an ecosystem (such as CoreML, a framework used across Apple products (e.g., macOS, iOS, watchOS, and tvOS), Amazon ML, Microsoft Cognitive Toolkit, TensorFlow, Apache Mahout, or Caffe2, without limitation).

Some classification controllers 308 use machine learning models in a specific format, others are compatible with a proprietary format as well as other formats. Many formats may be used without exceeding the scope of this disclosure. Notably, IBM Watson, at least presently, generates machine learning models (including deep learning models) that are in Apple's CoreML format and so may be used with Apple's Core ML framework.

In one or more embodiments, machine learning models of high level classifiers 304 may be trained to classify a segmented portrait into a high level category such as humanoid object, animal object, or structural object, without limitation. First labeled image segments 310 generated by high level classifiers 304 are used by respective machine learning models of stages of increasingly granular classifiers 306 trained to classify the labelled high level segmented portrait into further categories to generate final labeled image segments 312. Non-limiting examples of further categories of humanoid objects include gender, age, android, human with a specific blood type (e.g., Rh negative blood type), and ancestry (e.g., sharing a common ancestor). Non-limiting examples of further categories of animal objects include genus, domesticated or wild, breed if domesticated, and gender. Non-limiting examples of further categories of structural objects include builder, civilization.

The training data set is examined with deep learning technology, an advanced type of artificial intelligence machine learning. Machine learning models are trained on a server and later downloaded for use by a mobile or desktop application. For example, models are trained to recognize a segmented image with a humanoid object with Rh negative blood type, green eyes, red hair, and other unique traits and classify the humanoid image as a non-human alien or an android or as humans with Rh negative blood.

FIG. 4A is a functional block diagrams depicting style effects 400, in accordance with one or more embodiments. Style effects 400 is a non-limiting example for implementing style effects 124 of FIG. 1.

Generally, style effects 400 is configured, generally, to generate styled image segments 410 from labelled image segments 402, and more specifically, from segment masks 404 and labels 406. Style transformer 408 may include a machine learning model trained to apply a style to an image segment. For example, Convolutional Neural Networks may be trained by feeding a model examples of a given artistic style and sample images of the examples. A training algorithm trains the CNN model to learn and apply the trained artistic style to a new image, as a non-limiting example, using convolution.

A specific one of a number of style transformers 408 may be selected in response to categories of labels 406 applied to the labelled image segment 402. For example, in a case where the segmented object of labelled image segment 402 is a person's portrait, a specific style transformer 408 may be selected for segmented objects labelled with specific human characteristics, such as a blood group system (e.g., RH negative, without limitation), a hair color, emotions, qualities (e.g., good or evil, without limitation), genetic disorders, temperament ("e.g., happy, sad, anxious, bored, without limitation) or something else.

FIG. 4B is a functional block diagram depicting style effects 400 in accordance with another embodiment. In this embodiment, the segmented image (here, labelled image segment 402) is modified, by providing image overlay 412 that is applied to labelled image segment 402 via image editor 414 before applying style transformer 408 to generate styled image segment 416 that includes the styled overlay. By way of non-limiting example, for a given segmented image of a person, an image overlay can be an eye overlay or a face mask overlay. The system and method then applies the style transfer to the segmented image that includes the image overlay. In various embodiments, image overlay 412 may be applied manually by a user controlling image editor 414, by further image segmentation that segments and labels various class features (e.g., facial elements such as eyes, hair, nose, chin, lips, teeth, ears, eyebrows, for forehand without limitation, or architectural elements of a structure, without limitation).

Additionally or alternatively to style transformers of FIG. 4A and FIG. 4B, style transfer models may be used to apply style effects to an image segment that accept an input a style image (e.g., an image or image segment having desired expressive elements) and a content image (i.e., labelled image segment 402).

Figure 5:
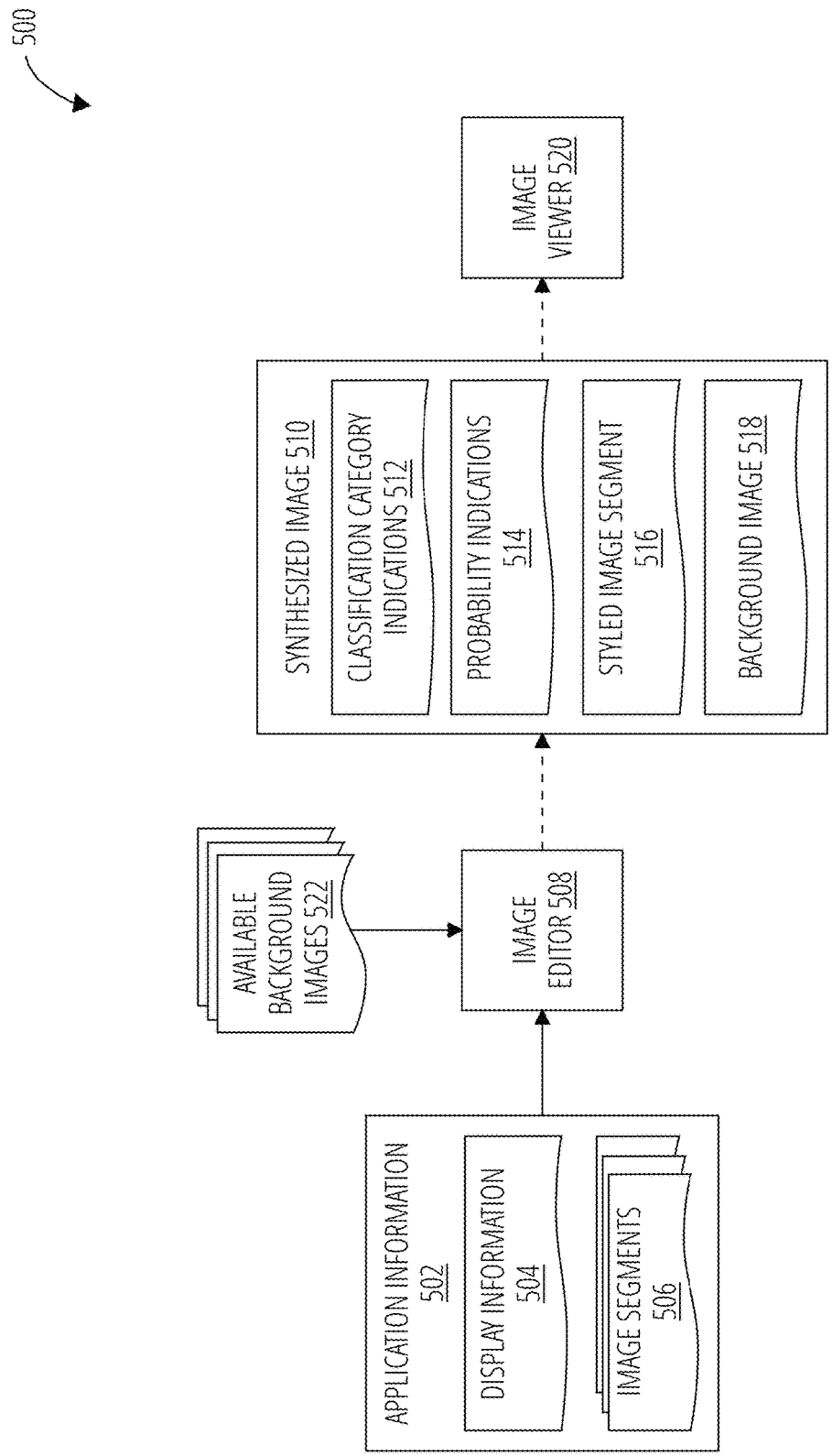
FIG. 5 is a diagram depicting an example of image synthetization, in accordance with one or more embodiments.

FIG. 5 is a diagram depicting image synthetization 500 in accordance with one or more embodiments. Application information 502 includes display information 504 (e.g., classification category indications, and probability indications for classification indications, without limitation) and image segments 506 (e.g., marked and/or styled image segments, without limitation), and image editor 508 combines that information (e.g., using image synthesis, without limitation) to generate a synthesized image 510 that includes one or more of classification category indications 512, probability indications 514, styled image segment 516, and background image 518. Image viewer 520 may be used to present a viewable depiction of synthesized image 510 at a display of a computing apparatus, for example, within a specific execution of a mobile application that includes synthesized image 510.

Once an image is segmented, identified, and styled, a background image of an input image maybe replaced with another background, here, one of the available background images 522. In some embodiments, a background image may be selected manually via user interface 112. Additionally or alternatively, a background image may be selected automatically by a user application in response to a category of a class label applied to styled image segment 516 or in response to a specific style effect applied to styled image segment 516. In some embodiments, an automatically selected background may be presented to a user at display 110 and then the user may accept the background or select another one of the available background images 522. In some embodiments, image synthetization 500 may be configured such that automatically selected background images and manually selected background images are combined with styled image segment 516 by image editor 414 and presented to a user at display 110 to assist a user with selecting a background image 518 for a synthesized image 510.

In one example, the replacement background maybe a location or a scene different from the location in the input image, such as an image of planet associated with a specific classification category with which a segmented image has been labeled.

In one embodiment, the background replacement operation is achieved by making the pixels in the style transfer combination transparent (alpha value of zero). This isolates the style transfer combination. Next a new background image is applied and is placed behind the isolated style transfer combination.

In one embodiment, the background replacement operation adjusts the alpha transparency of the isolated style transfer combination. In this manner, the synthesized output image may include the segmented and style object overlaying a new background with a given degree of transparency, e.g., specified by a user during a specific execution of a mobile application that includes image synthetization 500.

Figure 6:
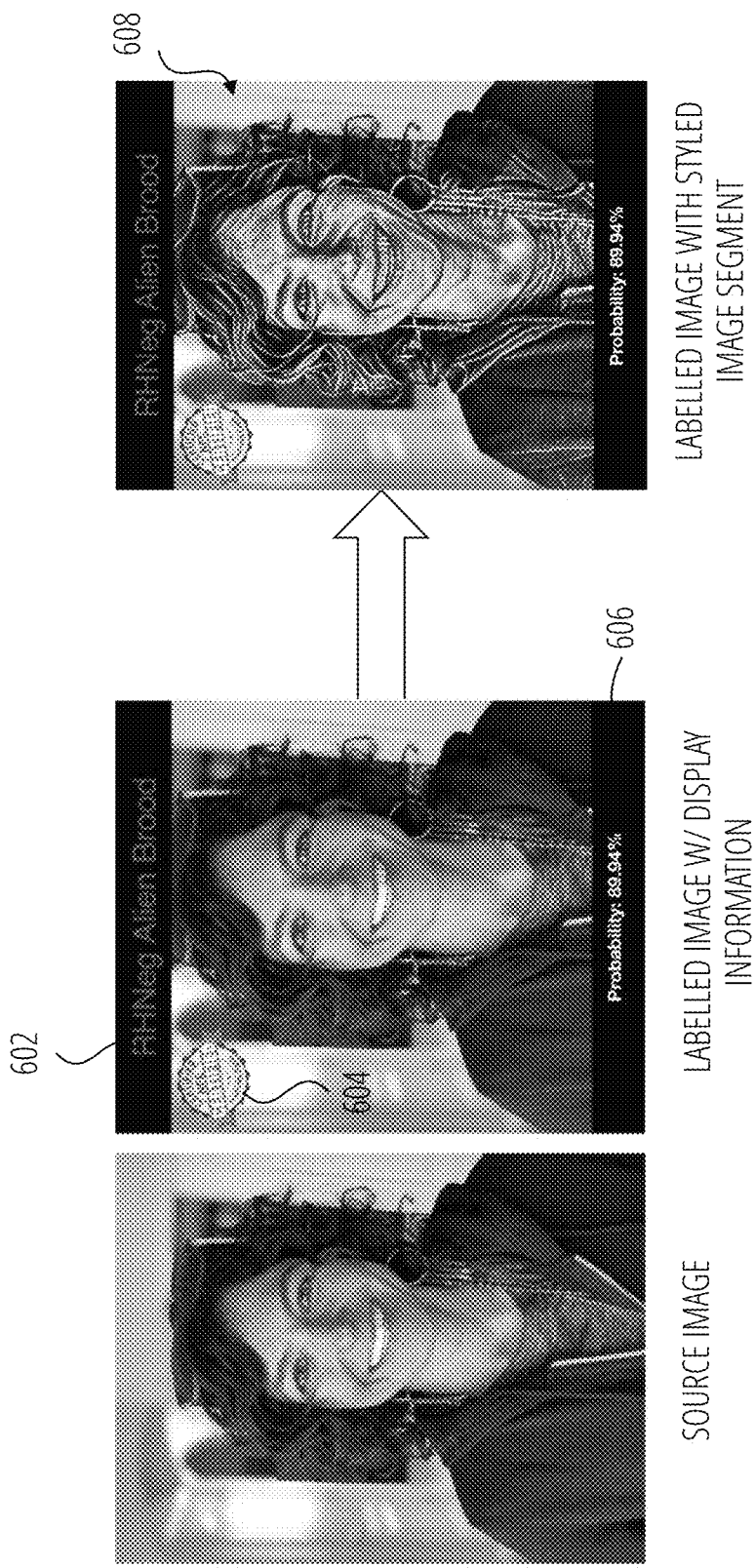
FIG. 6 is a diagram depicting a segmented and recognized image with the style transfer effect applied only to the image segment, in accordance with one or more embodiments.

FIG. 6 is a diagram depicting a segmented and recognized image with the style transfer effect applied only to the image segment, here the portrait image of a person, but not applied to the background. Further, in the specific non-limiting example depicted by FIG. 6, a person from the input image (source image) is identified as an RH negative alien brood (classification category indication 602) and certified "Not From Here" (NFE) (stamp 604), for example. Probability of RHNeg Alien brood is 89.94% (probability indication 606). The RH negative individual is isolated from the image, a style transfer effect is applied (styled object 608).

In one embodiment, the style transfer operation is achieved by removing the background portion entirely by applying a zero alpha value to all the pixels that are not in the segmented image containing the portrait of the person. Once the segmented image has a transparent background, the style transfer effect is applied. The resulting image—being segmented, recognized and styled—is thus generated. Notably, the generated image segment is style transferred separate from an original image (e.g., a source image or a previously segmented image, without limitation), which avoids applying the style transfer to a background or other object present in the original image.

Machine learning takes in model data, passes it through algorithms, and then makes a prediction. Deep learning prediction improves on its own over time using neural networks and more example images. Image recognition works by the creation of a neural network with examples of classified images. The neural network then processes the individual pixels of an image. Developers teach the network how to recognize similar images by way of many examples.

For image recognition, the neural network is called a convolutional neural network. Any time a model is retrained on the server, the model may be converted to a form that is recognized by the interpreting software such as CoreML.

Figure 7:
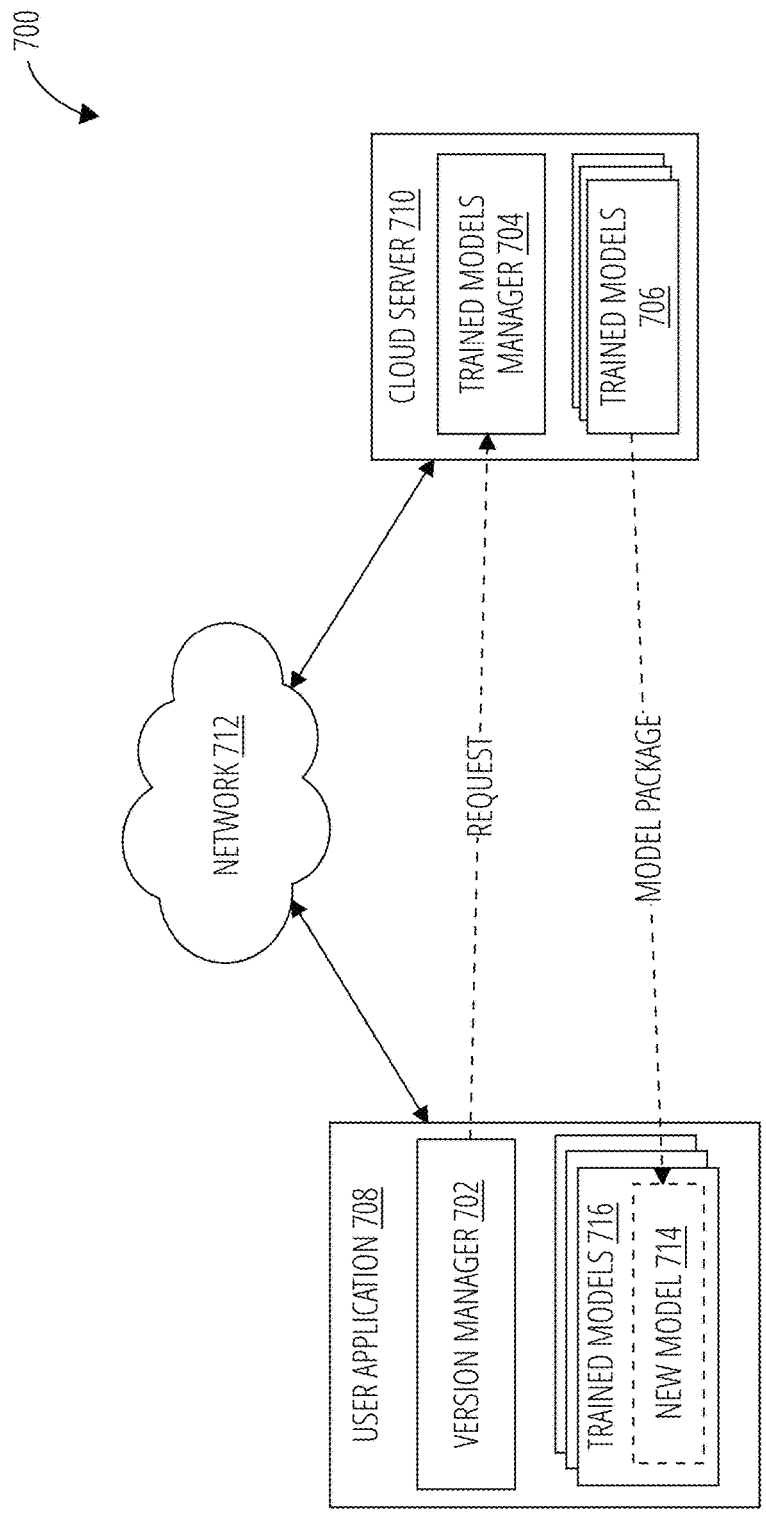
FIG. 7 is a schematic diagram depicting an embodiment of a management system configured for managing deployment of machine learning models for image segmentation, classification, and/or style effects transfer in accordance with one or more embodiments.

FIG. 7 is a schematic diagram depicting an embodiment of a management system 700 for managing deployment of machine learning models for image segmentation, classification, and/or style effects transfer in accordance with one or more embodiments.

In one embodiment, a version manager 702 of a mobile user application 708 (e.g., implementing or cooperating with one or more program modules 118) on a mobile device, tablet computer, laptop computer, or desktop computer (here, the computing apparatus 100) queries trained models manager 704 of cloud server 710 via network 712 for information about a latest version of a trained model (e.g., general object segmenter 210, specific object segmenters 212, high level classifiers 304, stages of increasingly granular classifiers 306, or style transformer 408, without limitation). If not, user application 708 downloads a latest version of trained models 706 for onboard image recognition, classification, segmentation, and/or style transfer, as the case may be.

Network 712 may be or include one or more communication networks suitable for transport of electronic data between user application 708 and cloud server 710. Various networks may be implemented in accordance with embodiments of this disclosure, including a wired or wireless: local area network (LAN) and a wide area network (WAN), wireless personal area network (PAN), without limitation. When used in a LAN networking environment, computers may be connected to the LAN through communication equipment including a network interface or adapter. When used in a WAN networking environment, computers typically include communication equipment including a modem or other communication mechanism. Some communication equipment includes components suitable for use in a LAN and a WAN network environment. Modems may be internal or external, and may be connected to a system bus via a user-input interface, or other appropriate mechanism. Computers may be connected over the Internet, an Intranet, Extranet, Ethernet, or any other system that provides communications.

For example, user application 708 implemented on a mobile device may have downloaded thereon a new version of an image recognition neural network model at new model 714 of trained models 716. Image recognition may then take place on the mobile or desktop with no need to contact a server because the model is onboard.

As discussed above, in some embodiments, version manager 702 may be configured to download and install new trained models received from cloud server 710. In some embodiments, installation involves making the instructions of a new trained machine learning model available to a program module (e.g., image segmentation or image classification modules, without limitation) such that the instruction code may be used to instantiate a process of the class of the machine learning model at runtime. In other embodiments, installation involves integrating instructions of a machine learning model into (e.g., embedding the instructions of a new machine learning model) either as a linked (e.g., at compile time or runtime) header file or inserting the instructions as a function or class definition within the source code of a program module such that the instructions of the machine learning model are incorporated at compile time. If previous versions of a machine learning model or machine learning models replaced with a different model are not desired they may be overwritten, effectively replaced when references are updated within a program module, deleted, or archived as desired.

Figure 8:
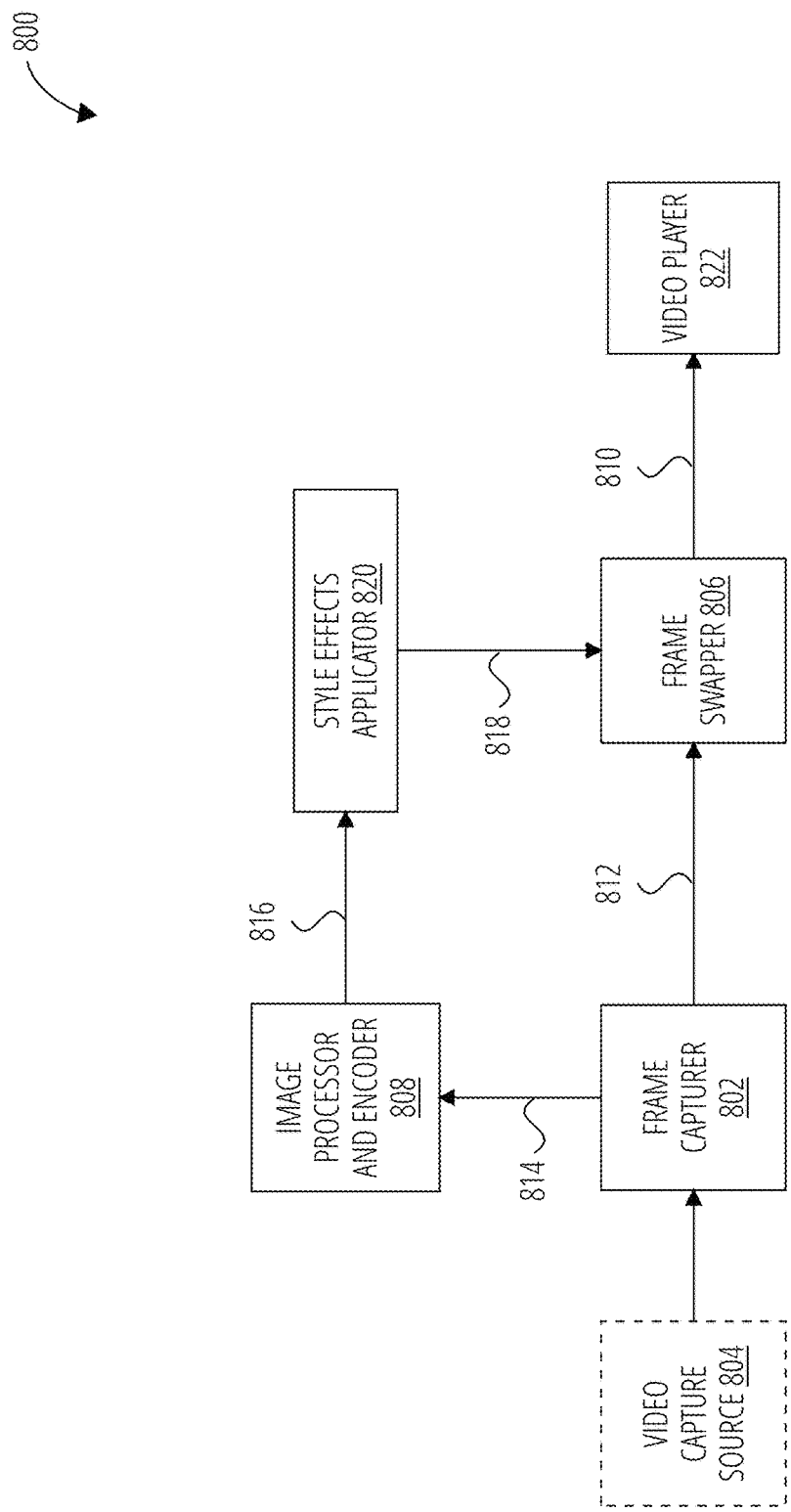
FIG. 8 is a functional block diagram depicting a video editing process flow, in accordance with one or more embodiments.

FIG. 8 is a functional block diagram depicting a video editor 800 that captures frames from a video, such a video stream from a video capture source 804 for style effects transfer, e.g., from a video camera or a video player. Frame capturer 802 captures frame 814 and image processor and encoder 808 applies image segmentation and classification to frame 814, and then style effects applicator 820 applies style effects to image segments 816 to generate a styled image segments 818 in a frame format. Frame swapper 806 swaps styled image segments 818 for frame 814 in video stream 812 to generate effected video stream 810. Video player 822 then plays effected video stream 810 including the effects in styled image segments 818. In some embodiments, frame swapper 806 may be configured to measure a difference between frames before and after frame 814, and for all frames within a difference threshold indicating little or negligible change in the scene among the identified frames, frame swapper 806 may swap those frames for frames having styled image segments 818.

Figure 9:
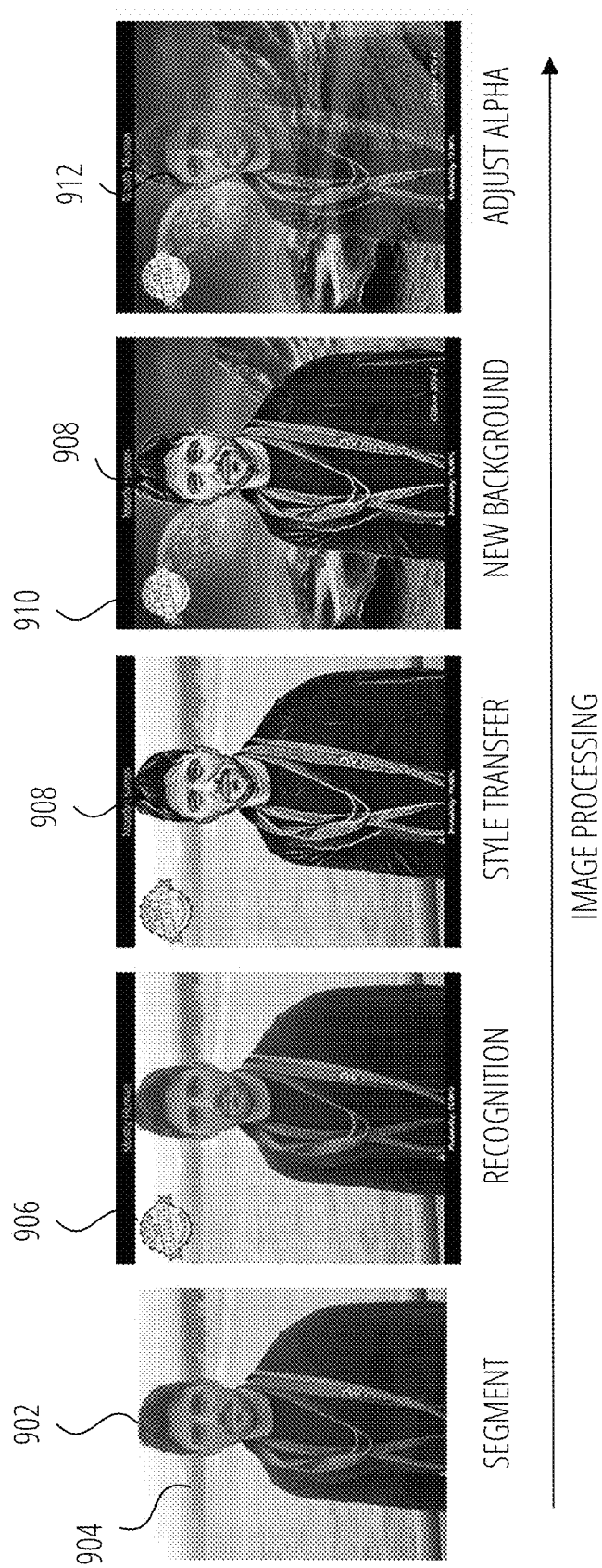
FIG. 9 is a diagram depicting a process flow of image data obtained by performing image segmentation, classification, style transfer and background modification in accordance with one or more embodiments.

FIG. 9 is a diagram depicting a process flow of image data obtained by performing image segmentation, classification, style transfer and background modification in accordance with one or more embodiments. A portrait object 902 and background 904 are present in the image segmented. A classification label is applied to the recognized image. In the third frame, style effects have been applied to the portrait object 902 to generate styled portrait 908, based on the classification label 906. In the fourth frame, background 904 has been replaced with new background 910. In the fifth frame, alpha has been adjusted on the styled portrait 908 so adjusted portrait 912 appears somewhat translucent in the synthesized image.

Notably, the principles discussed herein to generate synthesized images using image segmentation, classification, and style transfer with image segments and depth information may be used to detect image manipulation, editing, and synthesized images more generally.

Figure 10:
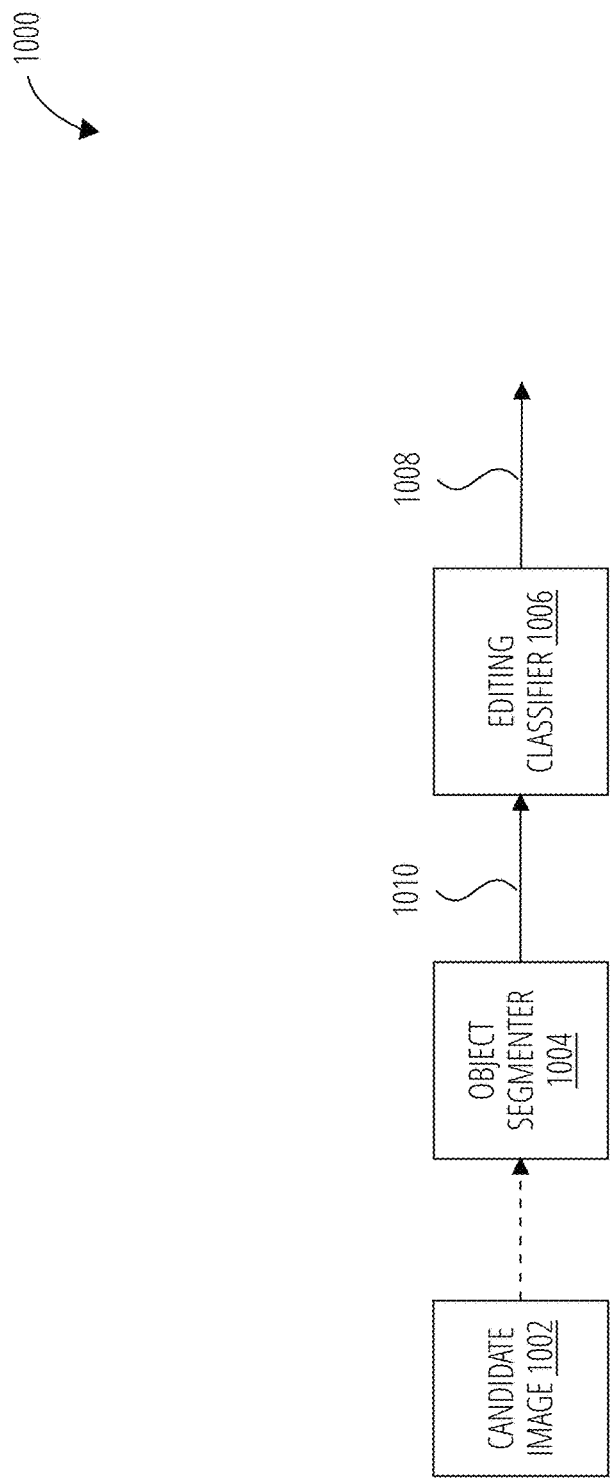
FIG. 10 is a functional block diagram depicting candidate image editing detection, in accordance with one or more embodiments.

FIG. 10 is a functional block diagram depicting candidate image editing detection 1000, in accordance with one or more embodiments. Object segmenter 1004 is configured to generate image segments 1010 in response to segmenting candidate image 1002. Editing classifier 1006 generates labeled image segment 1008, where the labels are applied to segmented objects present in the image segments and indicate a prediction about whether the image segments were edited.

As a non-limiting example, a drawer's bank will accept an image of a drawer's bank check captured by a mobile banking application to order transfer of funds from the drawer's account. An image of an actual bank check may be edited to change information on the check to frequently order a transfer from a drawer's account. Style transfer techniques are sometimes used to visually adjust a fraudulent image to make it look more "genuine." In some embodiments, a fraud detector may be trained using styled images segments of bank checks to detect image editing. Fraud examination software of a bank may deploy the trained fraud detector to process and flag suspicious bank check images, including marking locations on the image where editing appears to have been applied so that it may be further examined.

As another non-limiting example, some portraits present in an image may be edited to "improve" a person's looks by applying style transfer techniques such that, as non-limiting examples, a person appears older, younger, skinner, having better quality skin or muscle tone, taller, etc. Such images may be used on profiles for dating websites or services, job applications, fake identification that fraudulently identifies a person age, without limitation. In some embodiments, editing detectors may be trained using styled image segments of portrait images to detect image editing, including style transfers and flag such images.

As yet another non-limiting example, so called "fake news" sometimes employs the use of digitally modified images of scenes to, as a non-limiting example, propagate conspiracy theories or some other agenda of the author. Style transfers may be used to transfer a style from an original image of a scene to the doctored image in an attempt to obfuscate indicators (e.g., irregularities due to differences in the types of image capture or generation devices, lighting, or something else, without limitation) that might visibly tip off a viewer that an image was edited. In some embodiments, editing classifier 1006 may be trained using styled image segments of edited scenes for training data. In some embodiments, a web-crawler may collect a large number of images of scenes from the Internet and various kinds of style transfers may be applied to the images to create the training data.

Figure 11:
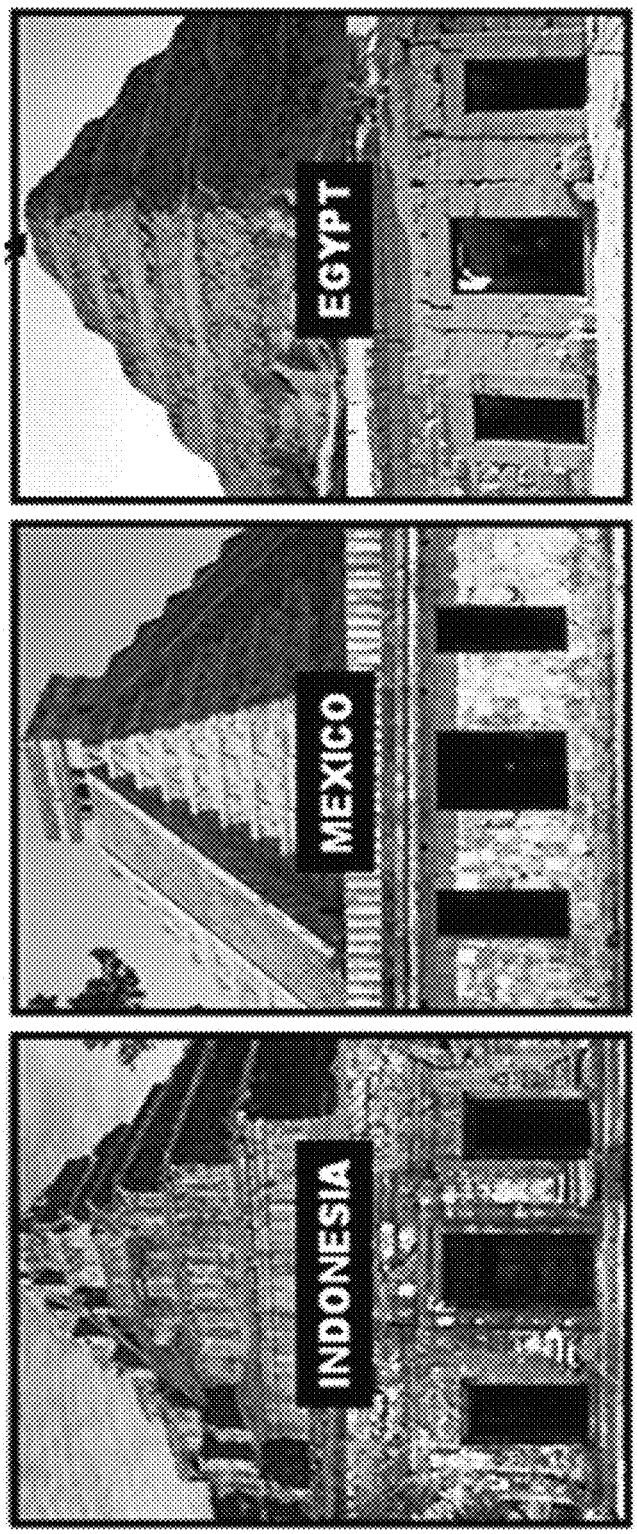
FIG. 11 is a diagram depicting resultant object images of structures having recognized origins and labeled with such via segmented images, in accordance with one or more embodiments.

FIG. 11 is a diagram depicting resultant object images of structures having recognized origins and labeled with such via segmented images, in accordance with one or more embodiments.

In some embodiments, the system and method of the present invention is applied in archeology for structure detection. For archeology, models are trained from images of ancient ruins and artifacts from around the world such as the Egyptian Pyramids, Moa Stone Heads and Gobecklie Tepe in south-east Turkey. With a trained machine learning model, new images are later instantly recognized and categorized with common characteristics to determine if there is common ancient builder.

So like the image recognition of humanoid objects described above, images of structures and artifacts are classified for archeology. Machine learning examines all the pixels to find similar characteristics that would take humans a long time to discover. For example, images of the oldest know pyramids may be classified as the originals. Then other pyramids are added to their own class. Machine learning can eventually predict if the later pyramids were made by the same builders (e.g., building cultures, without limitation) as the original. Turning back to FIG. 11, there are similarities in these pyramids that are located at entirely different places on Earth. Machine learning provides a way for archeologists to instantly predict, as a non-limiting example, a pyramid's origin.

In one embodiment, the method and system of the present invention combine IBM Watson image recognition models, trained in a cloud server, with Apple CoreML model downloads for image recognition processing. This enables on-sight (e.g., at an archeological site, without limitation) examination and classification of any ancient creation with a mobile device by an expert or non-expert user. After classification, an expert user such as an Archeologist may perform scientific verification. With less time doing the detailed work of classification and comparing, Archeologists can focus on their science.

While disclosed embodiments may be discussed in connection with machine learning models and deep learning models, a person having ordinary skill in the art would appreciate that other forms of logic may be used without exceeding the scope of this disclosure.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Instruction code of such modules may be stored as machine-readable instructions on a computer storage media including a non-transitory medium.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "each" means some or a totality. As used herein, "each and every" means a totality.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

One or more additional non-limiting examples of embodiments include:

Some embodiments relate, generally, to applying style transfer from a source image to a target image, and more specifically, to image segments of a target image to generate a synthesized image.

A method and a system implemented as a mobile application applies image segmentation to a source image to identify and segment an object present in the image (such as a human) from a background present in the image and applies object recognition and classification techniques to classify a recognized object into one or more categories (classification results). The method and system further synthesizes an output image by applying style transfer to the recognized object in the input image and replacing the background image based on the classification result.

In some embodiments, the method and system evaluates the segmented image using a machine learning model that was previously trained based on a set of labels and one or more sets of training data including images of objects with known category classification. The method and system generates a classification category and a probability indicator as output where the indicator provides a probability value of the object belonging to the classified category.

In some embodiments, the method and system applies style transfer to the segmented image to generate a style transferred image with specific visual image effect based on the classification. In some embodiments the method and system applies the style transfer to the segmented image using a machine learning model that was previously trained based on a set of labels and one or more sets of training data including images with pre-defined artistic styles. For example, the artistic style can include Picasso style paintings or classical paintings. The method and system generates the style transferred image as output where the style transferred image is the segmented image modified according to the style transfer model.

In some embodiments, the mobile application with the machine learning models is downloaded onto a mobile device for execution. The mobile device executes the mobile application (or "mobile app") to operate on an input image or a video to generate a synthesized output image. The synthesized output image includes an identification of the classification category, the probability indicator, a style transferred image of the object and a replacement background image.

In one example, the mobile application is a dating application. In a further example, the mobile application is a dating application for people who desire to date people with a given probability of certain blood features, e.g., Rh negative.

In some embodiments, a system and method synthesizes an output image from an input image or input video frames by performing image segmentation to identify a foreground object and a background in the input image. In some embodiments, the image segmentation is performed by using a depth pixel matte of the input image. The system and method applies a style transfer effect to the foreground object only using the depth map. In some embodiments, the system and method performs background replacement to replace the background in the input image with a replacement background image.

In one embodiment, a method for generating a synthesized image from an input image includes: receiving an input image and determining if the input image contains an image of a human. If the presence of a human is determined, the method identifies how many humans are present in the image. At least one of the humans in the image is identified as the object. The method then segments the image into a segmented image containing the object. The remaining portion of the image is considered the background image.

The method then performs classification on the segmented image using a previously trained machine learning model. The method determines a classification category and a probability indicator.

The method then applies style transfer to the segmented image based on the classified category. The style transfer is applied using a previously trained machine learning model. In some embodiment, the method modifies the segmented image by applying facial features or masks to the object in the segmented image. Then the method applies the style transfer to the modified image.

The method then applies a replacement background to the background image based on the classified category. The method generates the synthesized image as output where the synthesized image includes the style transfer modified image of the object and the replacement background, the classification category and the probability indicator.

In some embodiments, the system and method of the present invention is implemented in a computing system including at least a processor in communication with a memory, an imaging device (such as a camera), network interface, user interface and a display device.

One or more yet additional non-limiting examples of embodiments include:

A system comprising: a cloud server having learning algorithms for continuously training machine learning models; and a user application configured to cause a computing apparatus to generate styled image segments from a source image responsive to one or more machine learning modules, and to request machine learning models from the cloud server and install new machine learning models at the computing device in a manner accessible by the user application. In some embodiment, the user application is configured to request and install the new machine learning models dynamically. In some embodiments the new machine learning models are deep learning models for image classification. In some embodiments, the system, further comprising a developer application of the computing apparatus that is configured to enable a user manually select a downloaded machine learning model and embed instructions of the downloaded machine learning model in the user application. In some embodiments, the downloaded machine learning model comprises a style transformer.

A non-transitory computer readable medium of a mobile computing apparatus, the non-transitory computer-readable medium having stored thereon a synthesized image of a scene, the synthesized image including a styled image segment, a probability indication, a classification category indication, and a background image segment.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. A computing apparatus, comprising:
   a processor; and
   a storage media having machine-readable instructions thereon that, when executed by the processor, cause the processor to generate a synthesized image responsive to a source image, the machine-readable instructions comprising:
   an image segmentation machine-readable instructions configured to cause generation of an image segment via image segmentation of an object present in the source image;
   an image classification machine-readable instructions configured to cause classification of an image segment having the object responsive to a trained classification model;
   a style effect machine-readable instructions configured to:
   cause selection of a trained style transformation model from multiple trained style transformation models responsive to a class label applied to the image segment; and
   cause application of at least one style effect to the image segment responsive to the trained style transformation model; and
   an image synthetization machine-readable instructions configured to cause generation of a synthesized image having a styled object and display information.

2. The computing apparatus of claim 1, wherein the trained style transformation model is initiatable responsive to a class label applied to the image segment.

3. The computing apparatus of claim 1, further comprising a user interface, wherein the style transformation model is initiatable responsive to a user input received at the user interface, the user input comprising an indication of a style transformation model.

4. The computing apparatus of claim 1, wherein the display information is added dynamically responsive to a class label applied to the image segment.

5. The computing apparatus of claim 1, wherein the source image comprises a color pixel image and a depth pixel image, and the image segmentation machine-readable instructions are configured to cause image segmentation of the object present in the source image responsive to the depth pixel image.

6. The computing apparatus of claim 1, wherein the source image comprises a color pixel image, and the image segmentation machine-readable instructions are configured to cause image segmentation of the object present in the source image responsive to the color pixel image and without separately provided depth information.

7. The computing apparatus of claim 6, wherein the image segmentation machine-readable instructions include instructions of a deep learning model trained to segment an object from an image without depth information.

8. The computing apparatus of claim 1, wherein the image segmentation machine-readable instructions comprise machine-readable instructions configured to isolate instances of objects from the object.

9. The computing apparatus of claim 8, wherein the style effect machine-readable instructions comprise:
   machine-readable instructions configured to cause application of one or more style effects to one or more of the instances of objects isolated from the object.

10. The computing apparatus of claim 1, wherein mage synthetization machine-readable instructions comprise instructions configured to cause overlay of the styled image segment on a background image.

11. The computing apparatus of claim 1, further comprising a user interface adapted to receive a user input comprising an indication of a desired background image.

12. A portable computing apparatus, comprising:
   a display;
   an image capture device configured to capture a color pixel image and a depth pixel image of a scene; and
   a computer storage media having machine-readable instructions stored thereon, the machine-readable instructions comprising:
   a first machine-readable instructions configured to cause generation of an image segment via image segmentation of an object present in a foreground of an image captured by the image capture device;
   a second machine-readable instructions of a first and a second machine learning models on a computer storage media, the first machine learning model trained to cause classification of an image segment, and the second machine learning model trained to cause application of a style effect to the image segment according to a trained style transformation model selected from multiple trained style transformation models responsive to a class label applied to the image segment; and a third machine-readable instructions configured to cause presentation of a synthesized image at the display, an object present in the synthesized image having the style effect.

13. The portable computing apparatus of claim 12, wherein the image capture device comprises a depth sensing cameras.

14. The portable computing apparatus of claim 12, further comprising a user interface configured to receive a user input comprising a style effect indication.

15. The portable computing apparatus of claim 12, further comprising a user interface configured to receive a user input comprising a background indication.

16. The portable computing apparatus of claim 12, wherein the object present in the foreground of the image is a human portrait.

17. The portable computing apparatus of claim 12, wherein the object present in the foreground of the image is a man-made structure.

18. A method implemented by a mobile application, the method comprising:
   applying image segmentation to a source image to generate an image segment, the image segmentation to identify and segment an object present in the source image from a background present in the source image;
   applying object recognition and classification techniques to classify a recognized object represented by the image segment into one or more categories of classification results;
   selecting a trained style transformation model from multiple trained style transformation models responsive to a class label applied to the image segment;
   applying at least one style effect to the image segment responsive to the trained style transformation model; and
   synthesizing an output image by applying style transfer to the recognized object in the source image and replacing the background present in the source image.

19. The method of claim 18, wherein the recognition and classification techniques are deep learning models trained to classify and recognize objects responsive to objects present in image segments.

20. The method of claim 18, wherein the style transfer is a machine learning model trained to transfer at least some expressive elements of a first image to a second image.

21. The computing apparatus of claim 1, wherein the display information comprises: classification category indications and probability indications for classification category indications.

22. The computing apparatus of claim 1, wherein a form of the display information comprises one or more of: text, logo, stamp, or icon.

* * * * *